United States Patent Office 3,651,030
Patented Mar. 21, 1972

---

3,651,030
PROCESS FOR MAKING A MEMBRANE
Charles W. Desaulniers, Franklin, Cheryl A. Ford, Dedham, and Richard W. Mayo, Winchester, Mass., assignors to Amicon Corporation, Lexington, Mass.
No Drawing. Filed July 5, 1968, Ser. No. 742,516
Int. Cl. C08g *23/00, 33/00*
U.S. Cl. 260—79.3          6 Claims

ABSTRACT OF THE DISCLOSURE

A process for forming highly wettable and rewettable polysulfone membrane useful in fuel cells as moisture vapor transmissive, yet hydrogen retentive, barriers.

This process comprises the steps of subjecting a microporous membrane to treatment in an acidic bath to enable the pores to imibibe water more readily and more completely. In the preferred and most advantageous aspects of the invention, an anisotropic polysulfone membrane having a microporous barrier layer about 0.1 to 5 microns thick which layer comprises about 1% by volume of pores having an average diameter of from 20 to 100 angstroms is treated with the acid to form a novel, high performance membrane.

BACKGROUND OF THE INVENTION

This invention relates to a novel process for making membranes for use as moisture vapor transmission elements in fuel cells and the like and the novel membranes so formed. The novel membranes are anisotropic polysulfone membranes which have been after-treated with an oxidizing acid to render them wettable.

In a fuel cell, e.g., a hydrogen-oxygen fuel cell of the alkaline variety, one of the major problems is the successful removal of product water which is formed according to the chemical equations $$H_2 + 2OH^- \rightarrow 2H_2O + 2e^- \text{ (anode reaction)}$$

$$\tfrac{1}{2}O_2 + H_2O + 2e^- \rightarrow 2OH^- \text{ (cathode reaction)}$$

Operation of other types of fuel cells also results in the formation of water vapor, to wit: In the alkaline methanol fuel cells:

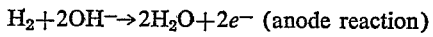

In the acidic methanol fuel cell:

This water must be removed from the fuel cell at the rate at which it is formed; but this removal must be accomplished without the escape of any of the other gases or liquids which are reactants in, and products of, the fuel cell reaction. Clearly the properties required for a membrane in a fuel cell are very stringent, they have not heretofore been achieved by any light simple membrane, but on the contrary have required the use of massive composite structures.

A successful water-vapor transmission membrane for fuel cell use must possess:

(1) Very high water vapor transport rate.
(2) Very low or zero hydraulic permeability.
(3) Very low or zero permeability to gases such as hydrogen, oxygen, nitrogen and the like.
(4) Chemical stability in an environment of an extraordinarily corrosive nature.
(5) Adequate mechanical strength.
(6) Thermal stability to 95° C., most advantageously to 150° C.

No really acceptable membrane for these purposes is known in the prior art.

SUMMARY OF THE INVENTION

It has been discovered that a particularly useful membrane for this application is a microporous polysulfone membrane, and most advantageously a highly anisotropic polysulfone membrane. By "anisotropic" is meant that class of membrane which has a very thin barrier skin and a thicker, more open support layer integral therewith. Typically, the barrier skin is between about 0.1 and 5 microns; the micropores forming channels through the barrier skin have effective average pore sizes of from 20 A. to 100 A., but are not restricted to these dimensions. The thickness of the support layer is much greater than that of the barrier skin and normally brings the total membrane thickness to a total thickness of about 0.003 inch or greater. However, the pore size of the support layer is so much larger than the micropores in the barrier layer that no significant additional resistance to fluid, gas or vapor transfer is encountered within the support layer. The void volume in the support layer is normally 50% to 80% of the total volume of the support layer.

A particularly fortuitous aspect of the invention is the discovery that polysulfone membranes can be made rewettable by post-treating the precipitated membrane with an oxidizing acid such as, for example, nitric acid, nitric and hydrochloric acids, nitric and sulfuric acids, chlorosulfonic acid, sulfonyl chloride and the like. Of these, nitric acid is preferred not only because it provides the most rapid rewetting but because it provides the highest degree of wettability of the rewetted membrane. Nitric acid, when used, is advantageously used in conjunction with hydrochloric or sulfuric acid. This list of acids is not meant to be interpreted as excluding other acids; on the contrary, the list is illustrative and will suggest other useful acids to those skilled in the art. By a "wettability" is meant the ability of the membrane to absorb water in the small pores of the barrier skin layer of the membrane.

Polysulfones are polymers having excellent resistance to thermal and oxidative degradation. The distinctive feature of such polymers is the presence of the sulfone group as a linkage in the polymer chain. Among preferred polysulfone polymers, i.e. those having the advantageous properties making them most suitable for us in the invention, a preferred commercially-available polysulfone comprises repeating units comprising a polysulfone linkage in a diphenylene sulfone group:

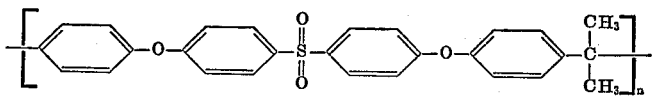

In this configuration, the sulfone linkage apparently tends to draft electrons from the adjacent benzene rings making them electron deficient and therefore relatively non-susceptible to oxidative attack. The resonant nature of aromatic rings make the diphenylene sulfone group capable of dissipating heat and radiation energy without chain scisson or crosslinking taking place.

Moreover, the excellent thermal properties of polysulfone permit it to maintain its utility over a temperature range extending from −150 to 300° F. or more. Some polysulfones are recommended for long term use at temperatures as high as 340° C. in air, e.g. the material sold under the trade designation P-1700 and P-2300 by Union Carbide Corporation. Furthermore, the mechanical properties of the polysulfones are excellent: the flexural modulus stays above about 300,000 pounds per square inch even at temperatures of 300° F. and above.

A suitable membrane meeting the stringent requirements of a moisture vapor transmission membrane can be formed as follows:

Twenty grams of polysulfone pellets of the type available under the trade designation P-1700 from Union Carbide Corporation are dissolved in 80 grams of N,N'-dimethylformamide at 25° C.–30° C.

The solution thus formed is cast upon a glass plate in a 0.011 inch thick film formed with a drawdown bar or other casting knife as known in the art. The edges of the glass plate are covered with tape and the casting solution extends to the tape. This procedure allows the underside of the membrane to be protected from seepage of liquid thereunder during a subsequent precipitation step. The film is then dipped into a gently-circulating bath of water at about 25° C. for about 10 minutes.

During submersion in the bath, a membrane is formed by a precipitative process, which membrane has a thickness of about 5 mils and comprises a spongy substructure of a void volume approximately 70–75% as calculated by the following formula $$\text{Void volume percent} = 100 - \left(\frac{\text{Apparent density of membrane}}{\text{Density of polymer}}\right)(100)$$

The membrane also comprises a very thin barrier skin of relatively dense configuration. The thickness of this skin is from about 1 to 4 microns (0.00005 inch to 0.0002 inch). And its void volume is preferably at least about 1% and usually not more than about 2%.

The membrane, still on its glass substrate, is removed to a second bath and leached for an additional period of time until the solvent is completely removed. This step has been found to be highly advantageous if the membrane is to be dried before subsequent use in a fuel cell.

In order to function most advantageously as a moisture-vapor transmitting membrane in a fuel cell, the nitrated membrane of the invention should have the pores in the barrier skin layer completely filled with liquid. It has been discovered that such a membrane will have a hydrogen flux of only 0.002 liter per minute per square foot of membrane surface at 50 pounds per square inch. Were the same membrane dry, it would permit the transport therethrough of 150 liters per ft.[2] per minute of hydrogen under the same operating conditions. A non-nitrated and water-filled membrane exhibits a hydrogen flux of 0.05 liter per ft.[2] per minute at 50 p.s.i. differential operating pressure. Thus, it is important that a membrane be highly wettable; it is also important that a membrane be rewettable after any drying so that it need not be kept in a wetted condition during the period after manufacture prior to installation in a fuel cell, and so that it need not be kept in a wetted condition during periods when the fuel cell itself is not in use, or is in storage, or is in transit. A polysulfone membrane prepared according to the procedure set forth above is, of course, in a wetted state upon being taken from the precipitating bath. However, once dried it is difficult to rewet. This will be easily understood when one considers the extermely small size of the pores in the thin barrier layer. Fortuitously, applicants have discovered means for modifying the surface thereof to render the polysulfone membrane, not only more completely wettable when maintained in a wet state, but also readily rewettable. This procedure is carried out by subjecting the membrane to an acid treatment after the precipitation of the membrane.

WORKING EXAMPLE 1

One procedure for accomplishing this acid after-treatment is as follows:

After the solvent has been leached from the precipitated membrane, the membrane is removed from the precipitating bath and is immersed in a bath consisting of 300 ml. of 96% $H_2SO_4$ and 200 ml. of 70% aqueous $HNO_3$. After a 3-minute treatment in this bath, the resultant nitrated membrane is found to have markedly superior wettability characteristics which characteristics are particularly advantageous when the membrane is used as a moisture-vapor transmissive barrier membrane.

WORKING EXAMPLE 2

Another means of after-treating the precipitated membrane is described below.

Twenty grams of a polysulfone available from Union Carbide under the trade designation Polysulfone 1700 are dissolved in 80 grams of N,N'-dimethylformamide at 25° C.–30° C. and cast on a glass plate as has been described above. The cast film is covered with a glass plate, and allowed to stand for a period of two minutes before being cast into a precipitation bath of the following composition:

|   | Ml. |
|---|---|
| Distilled water | 2000 |
| $H_2SO_4$ (98%) | 130 |
| $HNO_3$ (36%) | 87 |

The resulting membrane has the same low magnitude of hydrogen transport rate as the nitrated membrane but no nitration is detected on analysis by attenuated total reflectance infrared spectroscopy.

The water vapor transport for this membrane differed with pressure and temperature as follows:

| Temperature (° C.) | ΔP, mm. of mercury | Rate [1] |
|---|---|---|
| 40 | 40 | 420 |
| 50 | 89 | 575 |
| 70 | 230 | 1,300 |

[1] Grams of $H_2O$/100 in.²/24 hours.

These water vapor transmission rates are essentially the same when $H_2O$ or concentrated 40% KOH is the contacting liquid.

Membranes prepared according to the invention have very low water, i.e. hydraulic, flux values. For example, an aqueous solution containing 40% KOH has a permeation rate of less than about 0.02 gallon per square foot per day at a 100 p.s.i. pressure differential. No flux is detectable at lower pressure differentials, for example in the range of a 10 p.s.i. differential.

Membranes illustrated in Working Examples 1 and 2 were demonstrated to give exceptional performance both with respect to long service and extremely efficient separation when used in a fuel cell to separate KOH (on the one side) and gases including $H_2$ and water vapor (on the other side). The operation of this cell was carried out at temperatures of up to 190° C. to 205° C.

What is claimed is:

1. An anisotropic microporous membrane characterized by high moisture vapor transmissivity, ease of absorbing water, and suitability for use in a fuel cell, said membrane being formed of a polysulfone polymer having repeating units comprising diphenylene sulfone groups and comprising
   (1) a thin microporous barrier layer from about 0.1 to 5 microns in thickness having a porosity of at least about 1% by volume, the effective average pore size being from 20 A. to 100 A., and integral therewith
   (2) a macroporous support layer having from 50% to 80% voids by volume said membrane having been immersed in an oxidizing acid selected from the class consisting of nitric acid, a mixture of nitric and hydrochloric acid, a mixture of nitric and sulfuric acid, chlorosulfonic acid, and sulfonyl chloride.

2. A membrane as claimed in claim 1 in which the acid includes nitric acid.

3. The method of making an anisotropic microporous membrane characterized by high moisture vapor transmissivity, ease of absorbing water, and suitability for use in a fuel cell comprising casting a film of a solution in an organic solvent of a polysulfone polymer having repeating units comprising diphenylene sulfone groups, immersing said cast film in water to precipitate a membrane having a thin microporous barrier layer from about 0.1 to 5 microns in thickness having a porosity of at least about 1% by volume, the effective average pore size being from 20 A. to 100 A., and integral therewith, macroporous support layer having from 50% to 80% voids by volume, and subsequently immersing said membrane in an oxidizing acid selected from the class consisting of nitric acid, a mixture of nitric and hydrochloric acid, a mixture of nitric and sulfuric acid, chlorosulfonic acid, and sulfonyl chloride.

4. The method as claimed in claim 3 in which said acid comprises nitric acid.

5. The method of making an anisotropic microporous membrane characterized by high moisture vapor transmissivity, ease of absorbing water, and suitability for use in a fuel cell comprising casting a film of a solution in an organic solvent of a polysulfone polymer having repeating units comprising diphenylene sulfone groups, and immersing said cast film in an aqueous solution of an oxidizing acid selected from the class consisting of nitric acid, a mixture of nitric and hydrochloric acid, a mixture of nitric and sulfuric acid, chlorosulfonic acid, and sulfonyl chloride to precipitate a membrane having a thin microporous barrier layer from about 0.1 to 5 microns in thickness having a porosity of at least about 1% by volume, the effective average pore size being from 20 A. to 100 A., and integral therewith, a macroporous support layer having from 50% to 80% voids by volume.

6. The method as claimed in claim 5 in which said acid comprises nitric acid.

References Cited

UNITED STATES PATENTS

| | | | |
|---|---|---|---|
| 2,784,210 | 3/1957 | Le Fave | 260—464 |
| 3,322,728 | 5/1967 | Hill, Jr. | 260—78 |
| 3,341,366 | 9/1967 | Hodgdon, Jr. | 136—86 |
| 3,432,468 | 3/1969 | Gabler | 260—47 |
| 3,468,851 | 9/1969 | Yoda | 260—78 |

JOSEPH L. SCHOFER, Primary Examiner

C. A. HENDERSON, JR., Assistant Examiner

U.S. Cl. X.R.

136—86, 153